US008873511B2

(12) United States Patent
Bhalla et al.

(10) Patent No.: US 8,873,511 B2
(45) Date of Patent: Oct. 28, 2014

(54) INTERNETWORKING TECHNIQUES FOR TRANSFERRING PACKETS BETWEEN SOURCE AND TARGET SERVING GATEWAYS

(75) Inventors: Rajesh Bhalla, Gahanna, OH (US); Yonggang Fang, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 59 days.

(21) Appl. No.: 13/584,598

(22) Filed: Aug. 13, 2012

(65) Prior Publication Data

US 2012/0307802 A1    Dec. 6, 2012

Related U.S. Application Data

(63) Continuation of application No. 12/603,462, filed on Oct. 21, 2009, now Pat. No. 8,243,686.

(60) Provisional application No. 61/218,868, filed on Jun. 19, 2009.

(51) Int. Cl.
  *G01R 31/08*  (2006.01)
  *H04W 36/00*  (2009.01)
  *H04W 92/02*  (2009.01)

(52) U.S. Cl.
  CPC .......... *H04W 36/0066* (2013.01); *H04W 92/02* (2013.01)
  USPC ........................................................ 370/331

(58) Field of Classification Search
  CPC ... H04W 72/042; H04W 72/04; H04W 4/005; H04W 28/06; H04W 72/0413; H04W 52/146
  USPC ................ 455/403, 422.1, 436, 442; 370/331
  See application file for complete search history.

(56) References Cited

U.S. PATENT DOCUMENTS 6,216,004 B1 *  4/2001  Tiedemann et al. .......... 455/442
8,243,686 B2 *  8/2012  Bhalla et al. .................. 370/331
(Continued)

FOREIGN PATENT DOCUMENTS

CN       101128013 A       2/2008
KR     10-2008-0058382      6/2008
(Continued)

OTHER PUBLICATIONS

"E-Utran—eHRPD Connectivity and Interworking: Core Network Aspects," 3rd Generation Partnership Project 2 (3GPP2), 3GPP2 No. X.S0057-0 v1.0, 154 pages, Apr. 2009.
"E-Utran—eHRPD Connectivity and Interworking: Core Network Aspects," 3rd Generation Partnership Project 2 (3GPP2), 3GPP2 No. X.S0057-0 v2.0, 182 pages, Dec. 2009.
"E-Utran—eHRPD Connectivity and Interworking: Core Network Aspects," 3rd Generation Partnership Project 2 (3GPP2), 3GPP2 No. X.S0057-0 v3.0, 195 pages, Sep. 2010.
(Continued)

*Primary Examiner* — Fan Ng
(74) *Attorney, Agent, or Firm* — Perkins Coie LLP

(57) ABSTRACT

Techniques for wireless communications include operating first and second access networks to provide wireless service to wireless devices. The first and second access networks are associated with respective first and second gateways. The first gateway is operated to (1) receive a request for transferring wireless service of a wireless device from the second access network to the first access network and (2) send a message that includes key information to the second gateway based on the request. The second gateway is operated to (1) send session context information to the first gateway in response to the message and (2) forward a data packet associated with the wireless device to the first gateway. The forwarded data packet includes a packet data network identifier (PDN-ID) to identify a packet data network (PDN) associated with a downlink data packet.

16 Claims, 6 Drawing Sheets

(56) References Cited

U.S. PATENT DOCUMENTS

| | | | |
|---|---|---|---|
| 2006/0159047 A1* | 7/2006 | Olvera-Hernandez et al. | 370/331 |
| 2009/0036129 A1* | 2/2009 | Harada et al. | 455/436 |
| 2009/0047952 A1 | 2/2009 | Giaretta et al. | |
| 2009/0061878 A1* | 3/2009 | Fischer | 455/436 |
| 2009/0073933 A1* | 3/2009 | Madour et al. | 370/331 |
| 2009/0156212 A1* | 6/2009 | Motegi et al. | 455/436 |
| 2010/0284370 A1* | 11/2010 | Samar et al. | 370/331 |
| 2010/0322163 A1* | 12/2010 | Bhalla et al. | 370/329 |
| 2012/0307802 A1* | 12/2012 | Bhalla et al. | 370/331 |

FOREIGN PATENT DOCUMENTS

| | | |
|---|---|---|
| WO | 2006/078630 A2 | 7/2006 |
| WO | 2007/033238 A2 | 3/2007 |
| WO | 2007/092617 A2 | 8/2007 |
| WO | 2009/017446 A2 | 2/2009 |

OTHER PUBLICATIONS

Dommety, G., "Key and Sequence Number Extensions to GRE," Internet Society IETF Journal, RFC 2890, pp. 1-7, Sep. 2000.

Farinacci, D., et al., "Generic Routing Encapsulation (GRE)," Internet Society IETF Journal, RFC 2784, pp. 1-9, Mar. 2000.

Jung, Yun-Seok, KIPO Authorized Officer, International Search Report and Written Opinion mailed on Jun. 28, 2010 for International Application No. PCT/US2009/061536 (6 pages).

Yokota, H., et al., "Fast Handovers for PMIPv6—draft-yokota-mipshop-pfmipv6-03.txt," Internet Society IETF Journal, Internet Draft, pp. 1-29, Jul. 2008.

Yokota, H., et al., "Fast Handovers for Proxy Mobile IPv6—draft-ietf-mipshop-pfmipv6-09.txt," Internet Society IETF Journal, Internet Draft, pp. 1-37, Sep. 2009.

Japanese Office Action mailed on Jul. 1, 2014 for Japanese Application No. 2013-220776, filed Oct. 21, 2009 with translation (10 pages).

* cited by examiner

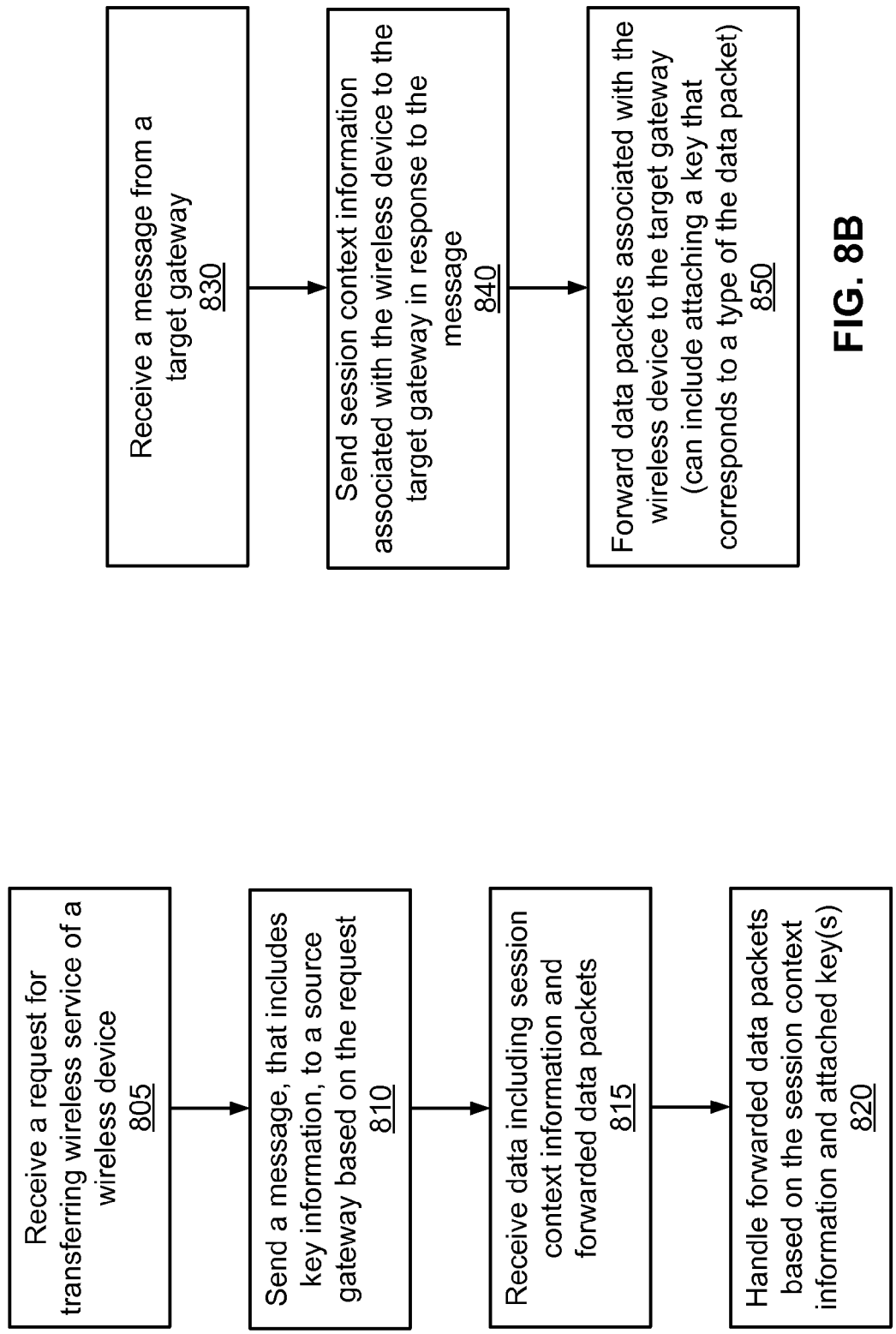

INTERNETWORKING TECHNIQUES FOR TRANSFERRING PACKETS BETWEEN SOURCE AND TARGET SERVING GATEWAYS

PRIORITY CLAIM AND CROSS REFERENCE TO RELATED APPLICATION

This document is a continuation of U.S. patent application Ser. No. 12/603,462, filed on Oct. 21, 2009, which claims the benefit of the priority of U.S. Provisional Application Ser. No. 61/218,868, filed on Jun. 19, 2009. The entire contents of which the before-mentioned patent applications are incorporated by reference as part of the disclosure of this document.

BACKGROUND

This document relates to wireless communications in wireless communication systems.

Wireless communication systems can include a network of one or more base stations to communicate with one or more wireless devices such as a mobile device, cell phone, wireless card, mobile station (MS), user equipment (UE), access terminal (AT), or subscriber station (SS). Each base station can emit radio signals that carry data such as voice data and other data content to wireless devices. A base station can be referred to as an access point (AP) or access network (AN) or can be included as part of an access network. Further, a wireless communication system can include one or more access networks to control one or more base stations.

A wireless device can use one or more different wireless technologies for communications. Various examples of wireless technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX).

SUMMARY

This document describes technologies, among other things, for transferring packets between source and target serving gateways.

In one aspect, techniques for transferring packets between source and target serving gateways can include operating first and second access networks to provide wireless service to wireless devices. The first and second access networks can be associated with respective first and second gateways. Techniques can include operating the first gateway to receive a request for transferring wireless service of a wireless device from the second access network to the first access network and send a message, that includes key information, to the second gateway based on the request. Key information can include a uplink key to forward uplink data packets associated with the wireless device to the first gateway and a downlink key to forward downlink data packets associated with the wireless device to the first gateway. Techniques can include operating the second gateway to send session context information to the first gateway in response to the message and forward a data packet associated with the wireless device to the first gateway. Forwarding the data packet can include sending one of the keys that corresponds to a type of the data packet. Techniques can include operating the first gateway to handle the forwarded data packet based on the session context information and the key that corresponds to the type of the data packet. Other implementations can include corresponding systems, apparatus, and computer programs, configured to perform the actions of the techniques, encoded on computer readable mediums.

These and other aspects can include one or more of the following features. Operating the second gateway to forward the data packet can include including an uplink data packet from the wireless device in a forwarding packet, including the uplink key in the forwarding packet, and sending the forwarding packet to the first gateway. Operating the second gateway to forward the data packet can include including a session reference identifier (SR-ID) in the forwarding packet to identify a user session associated with the wireless device. Session context information can include information that associates an Internet Protocol (IP) address of the wireless device with the SR-ID. Session context information can include information that associates multiple IP addresses of the wireless device with multiple SR-IDs, respectively.

Operating the second gateway to forward the data packet can include including a downlink data packet addressed to the wireless device in a forwarding packet, including the downlink key in the forwarding packet, and sending the forwarding packet to the first gateway. Operating the second gateway to forward the data packet can include including a packet data network identifier (PDN-ID) in the forwarding packet to identify a packet data network (PDN) associated with the downlink data packet. Session context information can include information that associates the PDN-ID with an Access Point Name (APN) and a network address of a gateway of the PDN.

A forwarded data packet can include an uplink data packet. Operating the first gateway to handle the forwarded data packet can include sending the uplink data packet to a packet data network based on receiving the uplink key with the forwarded data packet. A forwarded data packet can include a downlink data packet. Operating the first gateway to handle the forwarded data packet can include sending the downlink data packet to the first access network for delivery to the wireless device based on receiving the downlink key with the forwarded data packet. Techniques can include operating the first access network to deliver the downlink data packet to the wireless device based on the first access network's acquirement of the wireless device. In some implementations, first and second access networks can communicate with a wireless device based on the same wireless technology. In some implementations, first and second access networks can communicate with a wireless device based on different wireless technologies.

In another aspect, techniques for transferring packets between source and target serving gateways can include operating different access networks to provide wireless service to wireless devices and operating a first gateway to send a message to a second gateway in response to a wireless device's transfer between different access networks. The message can include a first key to forward uplink data packets to the first gateway and a second key to forward downlink data packets to the first gateway. Techniques can include operating the second gateway to send session context information to the first gateway in response to the message and to forward uplink and downlink data packets associated with the wireless device to the first gateway. Forwarding uplink and downlink data packets can include including the first key and the second key into respective uplink and downlink data packet forwarding communications. Techniques can include operating the first gateway to handle forwarded uplink and downlink data packets based on the session context information and respective first and second keys. Techniques can include operating the second gateway to include a session reference identifier in an uplink data packet forwarding communication to the first gateway. Techniques can include operating the second gateway to include a PDN-ID in a downlink data packet forwarding communication to the first gateway. Other implementations can include corresponding systems, apparatus, and computer programs, configured to perform the actions of the techniques, encoded on computer readable mediums.

In another aspect, techniques, apparatuses, and systems can include mechanisms for transferring user packets between source and target serving gateways of different networks such as an Evolved High Rate Packet Data (eHRPD) network and an Evolved Universal Terrestrial Radio Access Network (E-UTRAN).

In yet another aspect, systems for wireless communications can include a first access network to provide wireless service to wireless devices, a second access network to provide wireless service to wireless devices, a first gateway, that is communicatively coupled with the first access network, and a second gateway, that is communicatively coupled with the second access network. The first gateway can be configured to receive a request for transferring wireless service of a wireless device from the second access network to the first access network and send a handover message that includes key information. Key information can include a uplink key to forward uplink data packets associated with the wireless device to the first gateway and a downlink key to forward downlink data packets associated with the wireless device to the first gateway. The second gateway can be configured to receive the handover message from the first gateway, send session context information to the first gateway in response to the handover message, forward a data packet associated with the wireless device to the first gateway. Forwarding the data packet can include sending one of the keys that corresponds to a type of the data packet. The first gateway can be configured to handle the forwarded data packet based on the session context information and the key that corresponds to the type of the data packet.

The details of one or more implementations are set forth in the accompanying attachments, the drawings, and the description below. Other features will be apparent from the description and drawings, and from the claims.

BRIEF DESCRIPTION OF THE DRAWINGS

FIG. 8A shows an example of operations on a target gateway.

FIG. 8B shows an example of operations on a source gateway.

Like reference symbols in the various drawings indicate like elements.

DETAILED DESCRIPTION

Various wireless communication system use gateways to route information between different networked endpoints. Some gateways provide wireless devices with access to networks such as the Internet. For example, a wireless communication system can include multiple gateways to provide Internet Protocol (IP) connectivity and mobility to wireless devices.

This document describes, among other things, systems and techniques for transferring packets between source and target serving gateways. The described systems and techniques include interworking mechanisms for transferring packets between one or more wireless technologies including internetworking techniques for Evolved High Rate Packet Data (eHRPD) network and Evolved Universal Terrestrial Radio Access Network (E-UTRAN). The described systems and techniques include methods for segregating uplink and downlink user packet streams that belong to different user sessions active at a wireless device. This document includes descriptions of control plane and user plane protocol stacks relating to packet transferring procedures on multiple interfaces between source and target serving gateways.

A wireless communication system can include multiple serving gateways, such as HRPD Serving Gateways (HS-GWs), that provide IP edge functionalities to one or more UEs. In some system implementations, HSGWs and wireless devices such as UEs can be considered as edge functional entities on an eHRPD access part of eHRPD and E-UTRAN interworking networks. A HSGW can interface with a PDN Gateway (P-GW) and Policy and Charging Rules Function (PCRF) functional entities in an Evolved Packet System (EPS) core. In some implementations, a HSGW interfaces with an Access Network (AN) functional entity such as a HRPD access network.

A HSGW can use one or more communication interfaces such as H1 and H2 interfaces to perform a handover of packet handling functionality for a wireless device. A H1 interface protocol can be used to communicate routing information associated with a wireless device between gateways. Based on information from the H1 interface, a H2 interface protocol can append information append to uplink and downlink packets for tunneling over the H2 interface. In some implementations, a gateway can use routing encapsulating keys for identifying uplink and downlink H2 bearers tunnels in forwarding communications. In some implementations, a gateway can use identifiers that identify a specific user session on a wireless device or a packet data network associated with an IP connection. The gateway can selectively include one or more of the identifiers to identify packets belonging to an individual user session or packet data network in forwarding communications on uplink or downlink H2 bearer tunnels.

Figure 1:
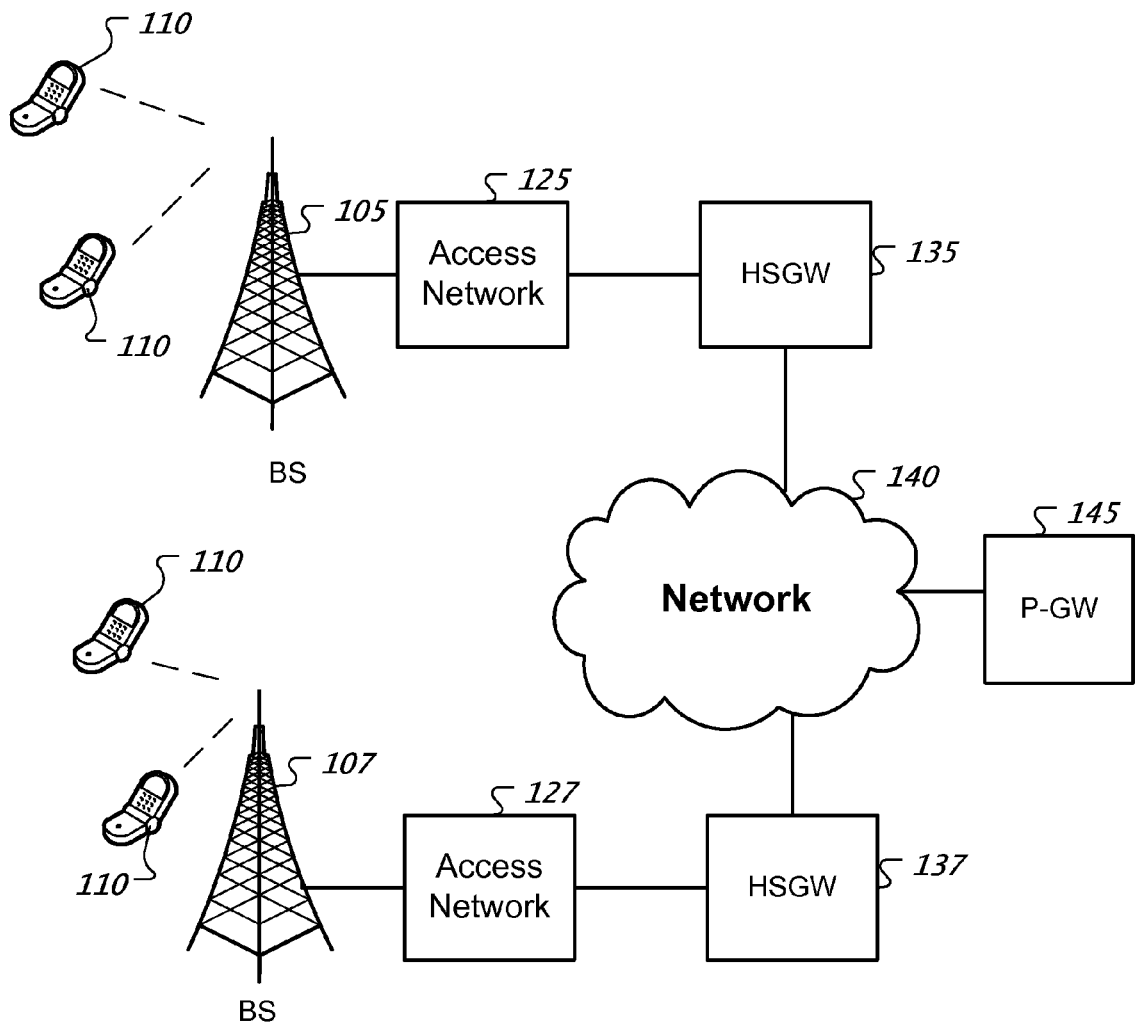
FIG. 1 shows an example of a wireless communication system.

FIG. 1 shows an example of a wireless communication system. A wireless communication system can include one or more base stations (BSs) 105, 107 to provide wireless service to one or more wireless devices 110. A base station 105, 107 can transmit a signal on a forward link (FL), called a downlink (DL), to one or more wireless devices 110. A wireless device 110 can transmit a signal on a reverse link (RL), called an uplink (UL), to one or more base stations 105, 107. A wireless communication system can include one or more Access Networks (ANs) 125, 127 and a data gateway such as a HRPD Serving Gateway (HSGW) 135, 137 for each AN 125, 127. In some implementations, ANs 125, 127 include respectively base stations 105, 107. HSGWs 135, 137 can communicate with a Packet Data Network (PDN) via a PDN Gateway (P-GW) 145 via a network 140. HSGWs 135, 137 can communicate with each other via a network 140. In some implementations, a wireless communication system can include multiple P-GWs to communicate with different PDNs. In some implementations, a wireless communication system can include a Policy and Charging Rules Function (PCRF).

Different base stations 105, 107 can use different wireless technologies. For example, one base station 105 can use E-UTRAN technology and a different base station 107 can use eHRPD technology. Various examples of wireless communication systems that can implement the present techniques and systems include, among others, wireless communication systems based Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. For example, a wireless communication system can include one or more networks based on eHRPD and one or more networks based on E-UTRAN.

Figure 2:
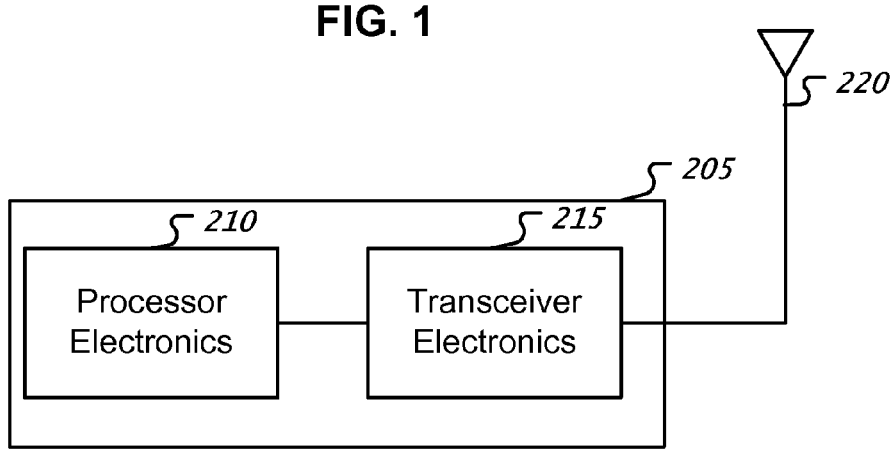
FIG. 2 shows an example of a radio station architecture.

FIG. 2 shows an example of a radio station architecture. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as an antenna 220. A radio station 205 can include other communication interfaces for transmitting and receiving data. A radio station 205 can include one or more memories configured to store information such as data and/or instructions.

HSGWs can use one or more communication interfaces to handle the transferring of packets when a wireless device switches access networks. For example, HSGWs can use an H1 interface for signaling between gateways and an H2 interface for transferring packets between gateways. In some H1 and H2 interface protocol stack implementations, a HSGW includes information in uplink and downlink user packet forwarding communications to enable tunneling of such user packets over a H2 interface. In some H1 and H2 interface protocol stack implementations, a HSGW includes information in uplink and downlink user packet forwarding communications to identify user packets as belonging to different user sessions. In some implementations, a target HSGW can send identifiers such as two Generic Routing Encapsulation (GRE) keys to a source HSGW during H1 signaling. An identifier such as a key can include multiple digital bits that represent a key value. HSGWs can use uplink and downlink GRE keys for segregating, respectively, uplink and downlink user packet streams. Uplink and downlink GRE keys with S-HSGW and T-HSGW H1 IP addresses can form logical endpoints of uplink and downlink H2 tunnels between the source and target HSGW entities.

A HSGW can provide additional traffic segregation. HSGW operations can include segregating uplink and downlink user packet streams that belong to different user sessions active on a UE. A HSGW can include additional information such as a session reference identifier (SR-ID) or a PDN identifier (PDN-ID) to further segregate traffic. In some H1 and H2 interface protocol stack implementations, segregating user packet streams can include adding SR-ID and PDN-ID information in uplink and downlink user packet communications, respectively.

Figure 3:
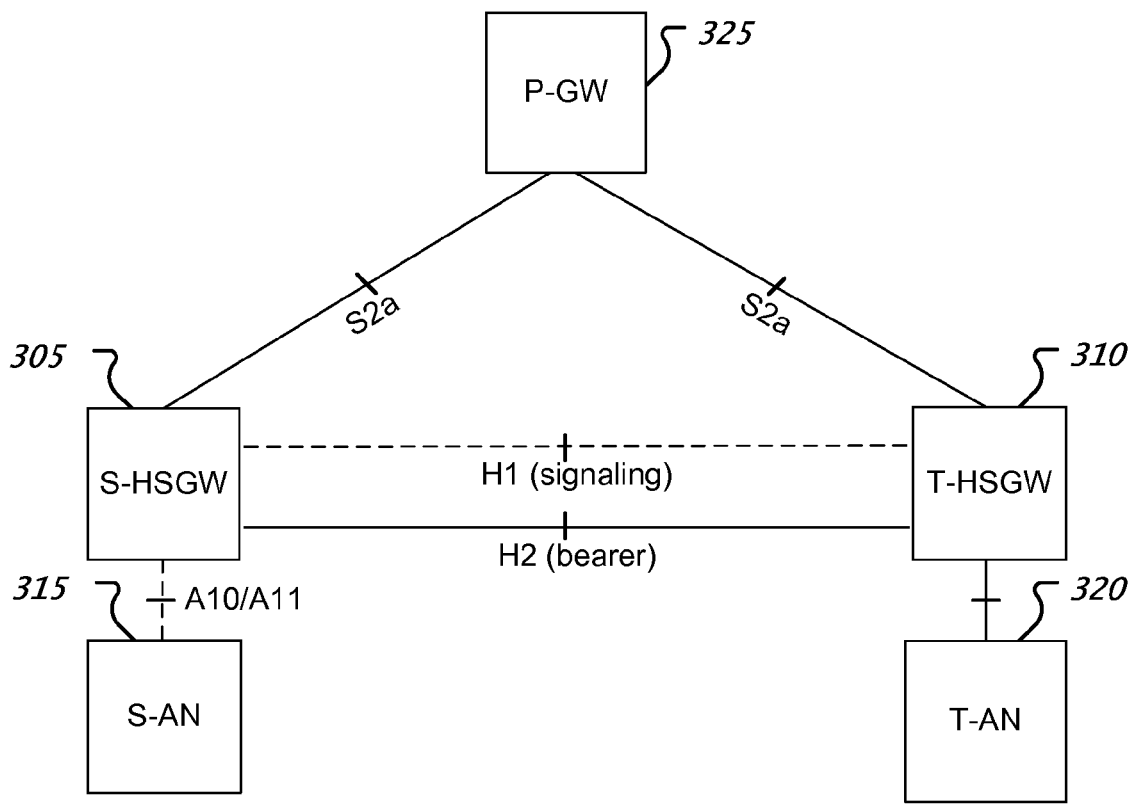
FIG. 3 shows an example of an inter-gateway handover architecture.

FIG. 3 shows an example of an inter-gateway handover architecture. An inter-gateway handover architecture can include communication pathways between multiple gateways such as HSGWs, to handle handovers between gateways. An inter-HSGW handover architecture can include different HSGWs 305, 310 that are configured to enable UE mobility. In this example, a Serving AN (S-AN) 315 provides wireless service to a UE and communicates with a Source HSGW (S-HSGW) 305 via an A10/A11 connection. The UE can move from the coverage area of the S-AN 315 to the coverage area of a Target AN (T-AN) 320. Based on the movement, the UE causes an interaction between a Target-HSGW (T-HSGW) 310, associated with the T-AN 320, and the S-HSGW 305 to manage a transfer of IP connectivity.

The UE can have one or more IP connections with one or more networks via one or more PDN gateways (P-GW) 325. In some implementations, a P-GW 325 can tunnel user packets to and from the S-HSGW via a S2a interface. As the UE moves from the coverage area of S-AN 315 to the coverage area of T-AN 320, the A10/A11 connections are established between the T-HSGW 310 and the T-AN 320; and the S2a connection is established between the T-HSGW 310 and the P-GW 325.

Wireless communication system can use one or more techniques described herein to provide an uninterrupted of user packets between the UE and the P-GW 325 during the transitioning of the UE's over-the-air connection from the S-AN 315 to the T-AN 320, and during the establishment of the A10/A11 and the S2a connections at the T-HSGW 310. S-HSGW 305 and the T-HSGW 310 can user a bearer plane interface such as a H2 interface to tunnel user packets between the S-HSGW 305 and the T-HSGW 310 to provide an uninterrupted flow of user packets during such inter-HSGW handoffs while user sessions at the UE are in the active state. In some implementations, the H2 tunnel is established after session context information has been exchanged between the S-HSGW 305 and the T-HSGW 310 via a control plane interface such as a H1 interface.

As multiple user sessions may be active at an UE with one or more P-GWs, techniques are disclosed herein to unambiguously identify uplink and downlink user packets tunneled over the H2 interface that belong to different user sessions. For example, a UE can use a first IP address for communications via a first P-GW and can use a second IP address for communications via a second P-GW. One or more of the techniques include including information such as a GRE keys for identifying UL and DL H2 bearers tunnels and SR-ID and the PDN-ID for identifying packets belonging to the individual user sessions on the UL and DL H2 bearer tunnels respectively.

In some implementations, when the UE moves to a coverage area of a new AN and the HRPD session is successfully transferred from the S-AN to the T-AN, the T-AN may select a new HSGW for serving the UE sessions. For example, if the S-HSGW is not reachable from the T-AN, then the T-AN selects a new T-HSGW for the UE sessions. The T-AN can provide S-HSGW H1 interface IP address information to the T-HSGW during an A10 connection establishment procedure. In some implementations, the T-AN receives S-HSGW H1 IP Address information from the S-AN based on procedures performed over the A16/A13 interfaces. Based on the S-HSGW IP address, the T-HSGW initiates H1 interface signaling with the S-HSGW requesting the later for the context information for active user sessions associated with the UE.

H1 interface signaling procedures between the S-HSGW and the T-HSGW can be based on the reactive handover procedures such as those for Fast Handovers for Proxy Mobile IPv6. The H2 interface can support "RFC 2784: Generic Routing Encapsulation (GRE)." The H2 interface can support GRE key field extensions based on "RFC 2890: Key and Sequence Number Extensions to GRE."

In some implementations, the key field value of a GRE packet header can identify a UL or DL traffic flow including UL or DL user data packets for a given UE. For DL traffic, the H2 interface can carry user IP packets, such as IPv4 or IPv6 packets, identified by the associated PDN-ID, over an underlying transport network. For UL traffic, the H2 interface can carry PDN-Mux or dedicated service connection traffic received over the A10 connection(s), identified by the associated service connection SR-ID, over an underlying transport network.

Figure 4:
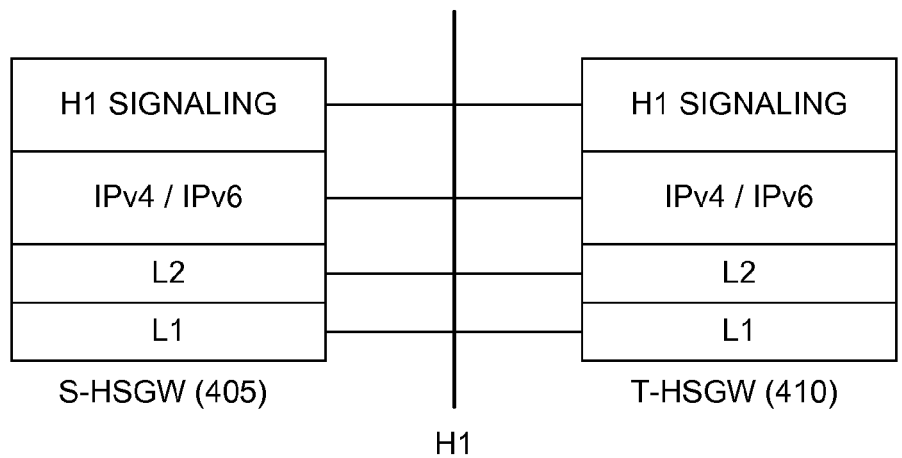
FIG. 4 shows an example of a H1 interface control plane protocol stack.

FIG. 4 shows an example of a H1 interface control plane protocol stack. In this example, a S-HSGW 405 and a T-HSGW 410 exchange signaling information over a H1 interface control plane protocol stack. An H1 interface control plane protocol stack can include a physical layer (L1), a data link layer (L2), a network layer (L3) such as IPv4 or IPv6, and a H1 signaling layer.

Figure 5:
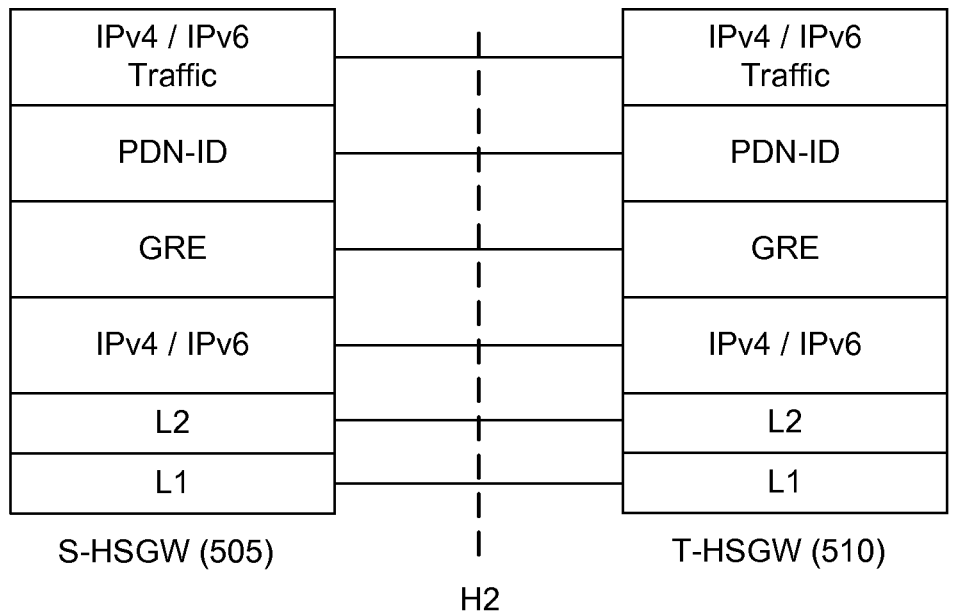
FIG. 5 shows an example of a H2 interface downlink user plane protocol stack.

FIG. 5 shows an example of a H2 interface downlink user plane protocol stack. In this example, a S-HSGW 505 forwards downlink data packets for a UE to a T-HSGW 510 using a downlink user plane protocol stack such as a H2 interface downlink user plane protocol stack. A H2 interface downlink user plane protocol stack can include a physical layer (L1), a data link layer (L2), a network layer (L3) such as IPv4 or IPv6, a GRE layer, a layer that identifies a PDN-ID associated with a downlink data packet, and a layer for communicating the contents of the downlink data packet, e.g., IPv4 or IPv6 traffic addressed to the UE. In some implementations, each user IPv4/IPv6 packet identified by the associated PDN-ID is sent over the transport network between the S-HSGW and the T-HSGW using the DL GRE key assigned via H1 signaling.

Figure 6:
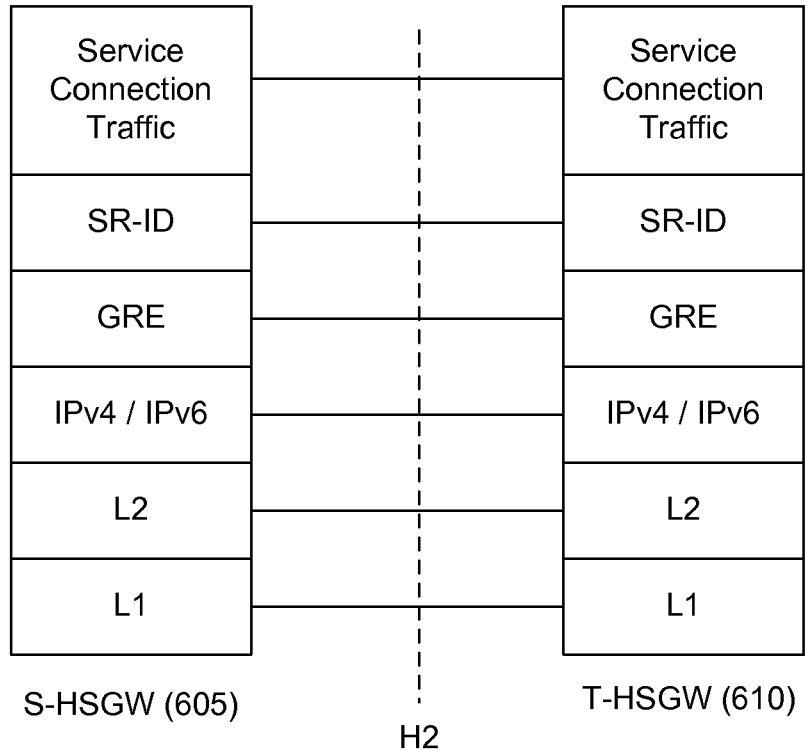
FIG. 6 shows an example of a H2 interface uplink user plane protocol stack.

FIG. 6 shows an example of a H2 interface uplink user plane protocol stack. In this example, a S-HSGW 605 forwards uplink data packets from a UE to a T-HSGW 610 using uplink user plane protocol stack such as a H2 interface uplink user plane protocol stack. A H2 interface uplink user plane protocol stack can include a physical layer (L1), a data link layer (L2), a network layer (L3) such as IPv4 or IPv6, a GRE layer, a layer that identifies a SR-ID associated with a uplink data packet, and a layer for communicating the contents of the uplink data packet, e.g., IPv4 or IPv6 traffic sent from the UE. In some implementations, A10 payload received over the service connection(s) identified by the associated service connection SR-ID is sent over the transport network between the S-HSGW and the T-HSGW using the UL GRE key assigned via H1 signaling.

Figure 7A:
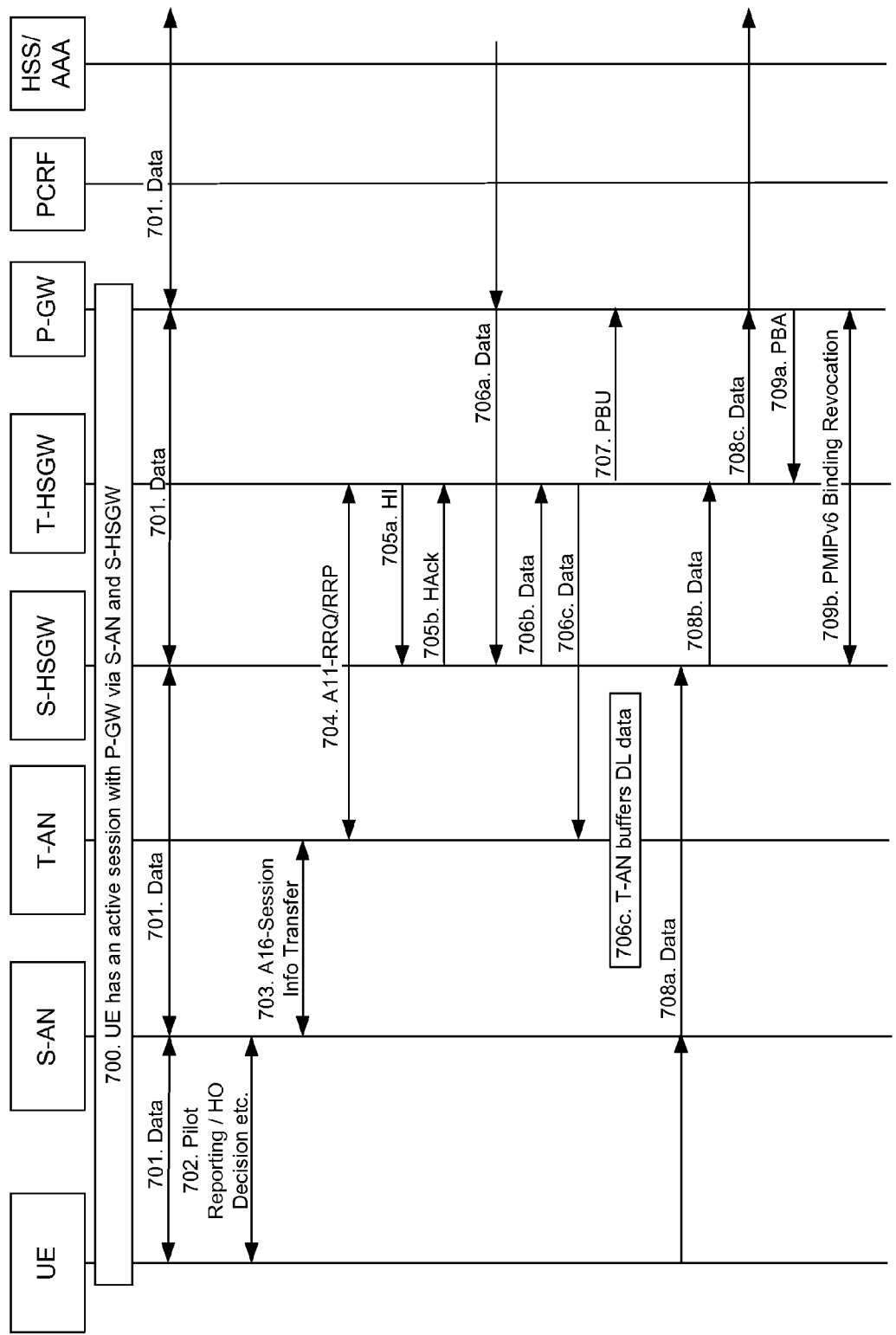
FIGS. 7A and 7B show an example of a communication flow for an inter-gateway handover.
Figure 7B:
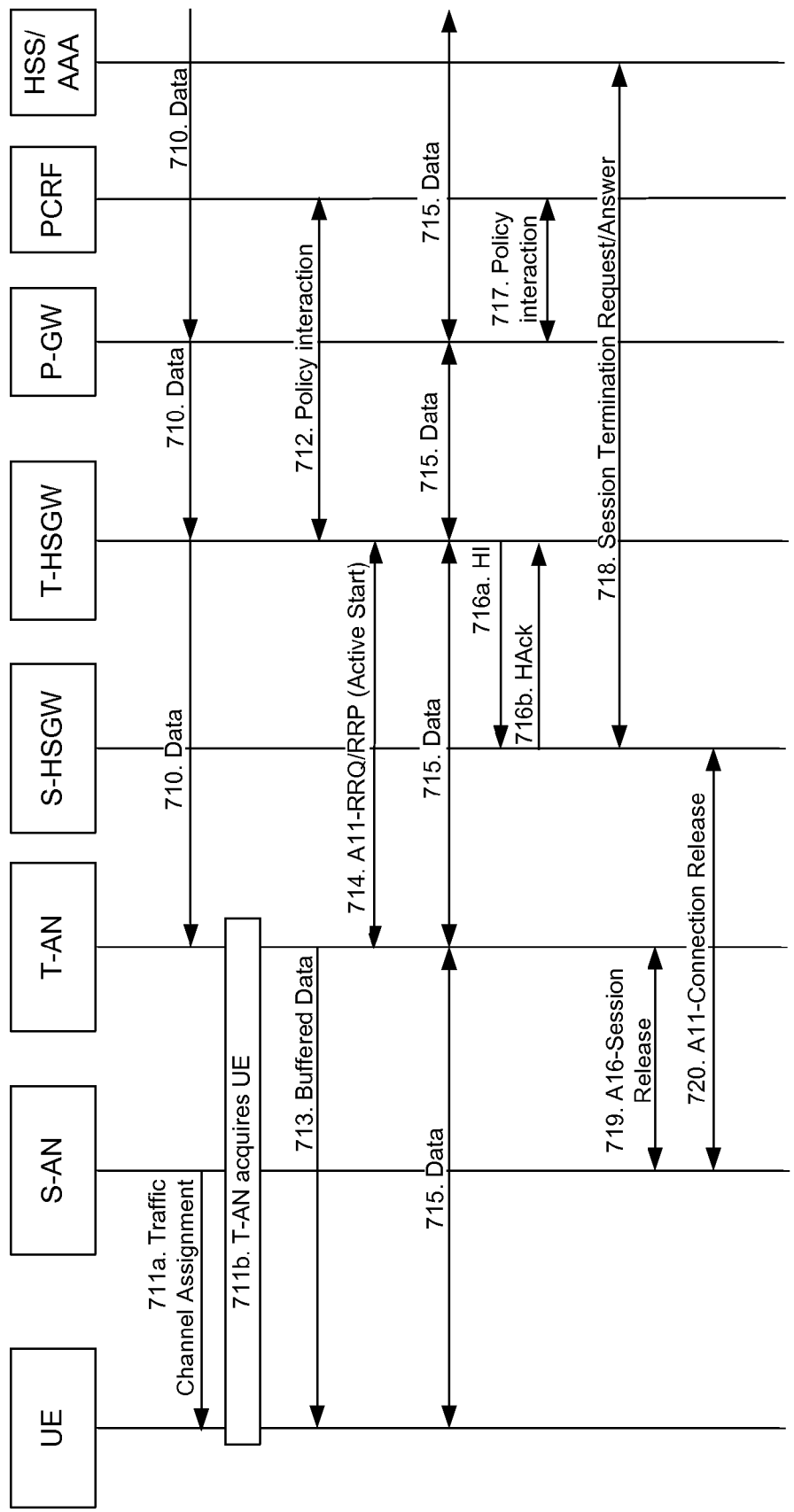

As split between two drawing sheets, FIGS. 7A and 7B show an example of a communication flow for an inter-gateway handover. In this example, when a UE connects to a T-AN, the UE requires a new HSGW, e.g., T-HSGW, for continued IP connectivity. As a result, a A10/A11 connection is required with the newly selected T-HSGW. During the handover procedure, S-HSGW and T-HSGW can use a H1 signaling interface to transfer information relating to one or more user sessions associated with the UE. Such information can include one or more UE IP addresses associated with one or more user sessions, one or more Traffic Flow Templates (TFTs), and PPP state. S-HSGW and T-HSGW can use a H2 bearer interface for UE UL and DL packet transfers from the S-HSGW to the T-HSGW.

At 700, the UE has an active session with the P-GW via the source AN (S-AN) and source HSGW (S-HSGW). For the purpose of this example call flow, only a single user session is shown between the UE and the P-GW. The UE may have several active sessions with one or several P-GWs.

At 701, an end-to-end path between the UE and the correspondent node is established and the UE can send/receive packets to/from the network via the S-AN, S-HSGW and P-GW.

At 702, the UE reports pilot strength of the neighboring ANs to the serving AN (S-AN). The S-AN determines the need for handing off the UE to the target AN (T-AN).

At 703, the S-AN performs A16-Session Information Transfer procedures with the selected T-AN over the A16 interface. Via such signaling, user session information is passed from the S-AN to the T-AN. User session information can include SR-IDs for one or more active user sessions, Session State Information Records, and the address of the S-HSGW.

At 704, the T-AN performs A11 Registration Request (RRQ) and A11 Registration Response (RRP) procedures with the T-HSGW to signal the handoff. A10/A11 message exchange from the T-AN includes the S-HSGW IP address, MSID of the UE, and sets the A10 connections for the UE, etc.

At 705a, triggered by A10/A11 signaling (e.g., at 704), the T-HSGW sends a Handover Initiate (HI) message to the S-HSGW to request the user session context, subscription context, etc. A Handover Initiate message can include a MSID of the UE and two or more GRE Keys. In some implementations, a Handover Initiate message can include two GRE Keys that the T-HSGW uses for the two uni-directional tunnel(s) between S-HSGW and T-HSGW for packet transfer. One GRE Key corresponds to the GRE tunnel for forwarding the UL packets to the T-HSGW and the other GRE Key corresponds to the GRE tunnel for forwarding the DL packets to the T-HSGW.

At 705b, the S-HSGW sends a Handover Ack (HAck) message to the T-HSGW with the session context information, TFTs etc. As an example, for each established user session (PDN connection), the HAck message includes session context information. Various examples of session context information includes one or more of: a mobile node network address identifier (MN-NAI), one or more IPv4/IPv6 addresses or prefixes associated with the UE, one or more Evolved Packet System (EPS) Access Point Names (APNs), one or more TFTs, one or more P-GW IP addresses, policy context, compression context, and PPP state. Such session context information can enable the T-HSGW to take over uninterrupted processing of user packets during the handover. Session context information can include indicia of relationships of each PDN-ID with APN, P-GW address, and the GRE key for UL traffic to the P-GW over S2a interface. Such information can enable uninterrupted processing of user packets between the T-HSGW and one or more P-GWs. In some implementations, a HAck message can include information arranged in a tag-length-value (TLV) format.

At 706a, user packets from the correspondent node continue to reach the S-HSGW via the P-GW. The S-HSGW extracts the DL packets over the S2a tunnel from the P-GW and forwards these packets to the T-HSGW over the DL H2 GRE tunnel by using the received DL GRE Key (e.g, DL GRE Key received at 705a).

At 706b, the PDN-ID corresponding to this user session can be added in front of each DL packet and the packet is sent to the T-HSGW as received from the P-GW.

At 706c, the T-HSGW performs packet processing based on the session context information received (e.g., session context information received at 705b) and the PDN-ID embedded before each of these DL packets, and forwards them to the T-AN. These packets are buffered there until the UE shifts the air-interface connection to the T-AN.

At 707, responsive to the HAck message, the T-HSGW sends a proxy-Mobile IP Proxy Binding Update (PBU) message to the P-GW to update the binding cache entry (BCE) for the UE with T-HSGW's IP address as the new S2a tunnel end-point.

At 708a, the UL packets, including any control signaling packets (e.g, RSVP, DHCP etc.) that the UE is still sending via the S-AN are received at the S-HSGW.

At 708b, these packets are forwarded by the S-HSGW to the T-HSGW over the UL GRE tunnel over the H2 interface using the UL GRE Key. The S-HSGW forwards the payload of the GRE packet it receives over the A10 tunnels to the H2 GRE tunnel. In some implementations, a S-HSGW adds the corresponding SR-ID in front of each A10 payload packet and places this as the payload of a communication on the UL H2 GRE tunnel.

At 708c, the T-HSGW performs packet processing for these UL packets such as processing for HDLC and PPP de-framing. The session context information and the SR-ID appended before each UL packet allows the T-HSGW to correlate each UL packet with the appropriate A10 connection and hence to the correct user session. The T-HSGW forwards user packets to the P-GW over a S2a interface.

At 709a, the P-GW updates its BCE, switches the data path to the T-HSGW and returns a proxy-Mobile IP Proxy Binding Ack (PBA) to the T-HSGW to indicate successful operation. The P-GW can perform a Registration Revocation procedure with the S-HSGW, such as sending an indication of a binding revocation.

At 709b, the P-GW sends a Binding Revocation Indication (BRI), such as a PMIPv6 Binding Revocation, to the S-HSGW and receives an acknowledgement.

At 710, now that the BCE is updated and the packet-path is switched, the DL packets from the P-GW start flowing to the T-HSGW. The T-HSGW forwards them to the T-AN. The T-AN buffers them until they can be delivered to the UE (after the air-interface connection is switched to the T-AN).

At 711a, the S-AN sends a Traffic Channel Assignment message to instruct the UE to switch to the new AN (T-AN). The S-AN can send such a message based on performing A16-Session Information Transfer procedures.

At 711b, the T-AN acquires the UE over the air-interface connection. The T-AN can now transmit buffered packets to the UE.

At 712, based on receiving the HAck message, the T-HSGW interacts with the PCRF, via a Gxa interface, to set up the policy associated with the bearer(s) of the UE.

At 713, the T-AN starts emptying its buffer and as the T-AN delivers the buffered DL packets to the UE.

At 714, based on acquiring the UE, the T-AN performs A11-Registration Request/Response message exchange with the T-HSGW which includes an Active Start Airlink record indication. This is to indicate to the T-HSGW that the path to the UE over the air-interface connection is now established via the T-AN.

At 715, at this time, both UL and DL traffic for the UE are going through the target system. After being acquired by the T-AN (e.g., at 711b), the UE can begin to send UL packets via the T-AN. After the P-GW switches the data path to the T-HSGW, the T-HSGW receives DL packets from the P-GW and forwards the DL packets to the T-AN.

At 716a, after the binding revocation (e.g., at 709b) and after the T-HSGW detects that there has been no packets for a configurable period of time over the H2 tunnel, the T-HSGW sends a H1 message to tear down the H2 tunnels between the S-HSGW and T-HSGW.

At 716b, the S-HSGW sends a HAck message to acknowledge successful teardown of the H2 tunnel(s). The S-HSGW deletes all context for the UE.

At 717, based on information in the PBU, the P-GW interacts with the PCRF (via the Gx interface) to setup the policy associated with the new bearer(s) via the target system. This can happen in parallel with the S2a tunnel set up.

At 718, the S-HSGW performs a Session Termination Request/Answer procedure with the HSS/AAA to update its state information.

At 719, based on acquiring the UE and being assured that access to the system by the UE would be directed to the T-AN, the T-AN performs an A16-Session Release procedure with the S-AN. This message exchange indicates that the session is now under control of the T-AN. The S-AN can terminate its connection with the S-HSGW and can purge the session associated with the UE.

At 720, After sending the HAck message to acknowledge successful teardown of the H2 tunnel(s), the S-HSGW performs A11 connection release procedures with the S-AN to request tearing down the A10 connection with the S-AN.

FIG. 8A shows an example of operations on a target gateway. A target gateway, such as a T-HSGW, can receive a request for transferring wireless service of a wireless device (805). The target gateway can send a message to a source gateway based on the request (810). The message can include key information. Key information can include a uplink key to forward uplink data packets associated with the wireless device to the target gateway. Key information can include a downlink key to forward downlink data packets associated with the wireless device to the target gateway. The target gateway can receive data including session context information and forwarded data packets (815). Receiving a forwarded data packet can include receiving a data packet with an attached key that corresponds to a type of the data packet, e.g., uplink data packet or downlink data packet. In some implementations, the target gateway can receive a communication that includes multiple forwarded data packets with multiple attached keys. The target gateway can handle forwarded data packets based on the session context information and attached one or more keys (820).

FIG. 8B shows an example of operations on a source gateway. A source gateway, such as a S-HSGW, can receive a message from a target gateway (830). The source gateway can send session context information associated with the wireless device to the target gateway in response to the message (840). The source gateway can forward data packets associated with the wireless device to the target gateway (850). Forwarding data packets can include attaching a key that corresponds to a type of a data packet.

Forwarding a data packet can include including an uplink data packet from the wireless device in a forwarding packet, including the uplink key in the forwarding packet; and sending the forwarding packet to the target gateway. In some implementations, forwarding a data packet includes including a SR-ID in the forwarding packet to identify a user session associated with the wireless device.

Forwarding a data packet can include including a downlink data packet addressed to the wireless device in a forwarding packet, including the downlink key in the forwarding packet; and sending the forwarding packet to the target gateway. In some implementations, forwarding a data packet includes including a PDN-ID in the forwarding packet to identify a PDN associated with the downlink data packet.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   receiving a request at a target gateway operating in a target access network for transferring wireless service of a wireless device from a source access network to the target access network;
   sending, from the target gateway, a handover initiate message comprising a downlink key to a source gateway operating in the source access network;
   receiving, at the target gateway, an acknowledgement message comprising protocol data network identification (PDN-ID) associated with an established user session;
   receiving, at the target gateway, subsequent to the receiving the acknowledgement message, a forwarding packet for the wireless device, the forwarding packet using the downlink key and the session context information, wherein the downlink key segregates downlink packet streams from uplink packet streams and the session context information identifies the PDN-ID associated with the forwarding packet; and
   forwarding the downlink packet to the target access network.

2. The method recited in claim 1, wherein the session context information includes information that associates the PDN-ID with an Access Point Name and a network address of a gateway of the PDN.

3. The method recited in claim 1, wherein the source access network and the target access network are based on the same wireless technology.

4. The method recited in claim 1, wherein the source access network and the target access network are based on different wireless technologies.

5. A target access server operable in a target access network, configured to:
   receive a request to transfer wireless service of a wireless device from a source access network to the target access network;

send a handover initiate message comprising a downlink key to a source gateway operating in the source access network;

receive an acknowledgement message comprising protocol data network identification (PDN-ID) associated with an established user session;

receive, subsequent to the receiving the acknowledgement message, a forwarding packet for the wireless device, the forwarding packet using the downlink key and the session context information, wherein the downlink key segregates downlink packet streams from uplink packet streams and the session context information identifies the PDN-ID associated with the forwarding packet; and forward the downlink packet to the target access network.

6. The server recited in claim 5, wherein the session context information includes information that associates the PDN-ID with an Access Point Name and a network address of a gateway of the PDN.

7. The server recited in claim 5, wherein the source access network and the target access network are based on the same wireless technology.

8. The server recited in claim 5, wherein the source access network and the target access network are based on different wireless technologies.

9. A method for wireless communications, comprising:
receiving, at a source gateway operating in a source access network, a handover initiate message comprising a downlink key from a target gateway operating in a target access network;

transmitting, to the target gateway, an acknowledgement message comprising protocol data network identification (PDN-ID) for an established user session; and transmitting, to the target gateway, subsequent to the transmitting the acknowledgement message, a forwarding packet for a wireless device, the forwarding packet using the downlink key and the PDN-ID, wherein the downlink key segregates downlink packet streams from uplink packet streams and the PDN-ID identifies a packet data network (PDN) associated with the forwarding packet.

10. The method recited in claim 9, wherein the PDN-ID includes information on an Access Point Name and a network address of a gateway of the PDN.

11. The method recited in claim 9, wherein the source access network and the target access network are based on the same wireless technology.

12. The method recited in claim 9, wherein the source access network and the target access network are based on different wireless technologies.

13. A gateway server operable in a source access network, configure to:
receive a handover initiate message comprising a downlink key from a target gateway operating in a target access network;

transmit, to the target gateway, an acknowledgement message comprising protocol data network identification (PDN-ID) for an established user session; and transmit, to the target gateway, subsequent to the transmitting the acknowledgement message, a forwarding packet for a wireless device, the forwarding packet using the downlink key and the PDN-ID, wherein the downlink key segregates downlink packet streams from uplink packet streams and the PDN-ID identifies a racket data network (PDN) associated with the forwarding packet.

14. The server recited in claim 13, wherein the PDN-ID includes information on an Access Point Name and a network address of a gateway of the PDN.

15. The server recited in claim 13, wherein the source access network and the target access network are based on the same wireless technology.

16. The server recited in claim 13, wherein the source access network and the target access network are based on different wireless technologies.

* * * * *